United States Patent
Silberstein et al.

(10) Patent No.: US 11,087,530 B2
(45) Date of Patent: *Aug. 10, 2021

(54) METHOD AND SYSTEM FOR ACCESSIBILITY AND CONTROL OF PARAMETERS IN SCENEGRAPHS

(71) Applicant: GRASS VALLEY CANADA, Montreal (CA)

(72) Inventors: Ralph Andrew Silberstein, Grass Valley, CA (US); David Sahuc, Nevada, CA (US); Donald Johnson Childers, Grass Valley, CA (US)

(73) Assignee: GRASS VALLEY CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,268

(22) Filed: Jun. 3, 2019

(65) Prior Publication Data

US 2019/0287295 A1 Sep. 19, 2019

Related U.S. Application Data

(63) Continuation of application No. 15/882,356, filed on Jan. 29, 2018, now Pat. No. 10,311,632, which is a continuation of application No. 15/043,290, filed on Feb. 12, 2016, now Pat. No. 9,911,227, which is a continuation of application No. 12/450,125, filed as
(Continued)

(51) Int. Cl.
*G06T 17/00* (2006.01)

(52) U.S. Cl.
CPC .......... *G06T 17/00* (2013.01); *G06T 2200/24* (2013.01); *G06T 2210/61* (2013.01); *G06T 2219/2012* (2013.01)

(58) Field of Classification Search
CPC . G06T 17/00; G06T 2200/24; G06T 2210/61; G06T 2219/2012; G06T 19/20
See application file for complete search history.

(56) References Cited

U.S. PATENT DOCUMENTS

| 5,982,388 A | 11/1999 | Nakagawa |
| 6,426,745 B1 | 7/2002 | Isaacs et al. |
| 6,693,645 B2 | 2/2004 | Bourges-Sevenier |

(Continued)

FOREIGN PATENT DOCUMENTS

| JP | 2005251161 A | 9/2005 |
| WO | 2006108990 A2 | 10/2006 |

OTHER PUBLICATIONS

First Office Action dated May 6, 2011 regarding China Application No. 200780052188.2.
Second Office Action dated Nov. 24, 2011 regarding China Application No. 200780052188.2.
Third Office Action dated Jun. 26, 2012 regarding China Application No. 200780052188.2.

(Continued)

*Primary Examiner* — Haixia Du
(74) *Attorney, Agent, or Firm* — Arent Fox LLP

(57) ABSTRACT

A method and system for providing access to and control of parameters within a scenegraph includes redefining components or nodes' semantic within a scenegraph. The set of components or nodes (depending on the scenegraph structure) are required to enable access from the Application User Interface to selected scenegraph information. In one embodiment, a user interface is generated for controlling the scenegraph parameters. In addition, constraints can be implemented that allow or disallow access to certain scenegraph parameters and restrict their range of values.

28 Claims, 5 Drawing Sheets

Related U.S. Application Data application No. PCT/US2007/015149 on Jun. 28, 2007, now Pat. No. 9,292,964.

(60) Provisional application No. 60/918,131, filed on Mar. 15, 2007.

(56) References Cited

U.S. PATENT DOCUMENTS

| | | |
|---|---|---|
| 7,030,890 B1 | 4/2006 | Jouet et al. |
| 2002/0085041 A1 | 7/2002 | Ishikawa |
| 2003/0132937 A1 | 7/2003 | Schneider et al. |
| 2004/0189667 A1 | 9/2004 | Beda et al. |
| 2005/0035970 A1 | 2/2005 | Wirtschafter |
| 2005/0039176 A1 | 2/2005 | Fournie |
| 2005/0131857 A1 | 6/2005 | Fujiki et al. |
| 2006/0274070 A1 | 12/2006 | Herman et al. |

OTHER PUBLICATIONS

Ken'ji Mase; "VR Rapid Protyping Language InvenTcl, bit," Japan, Kyoritsu Shuppan Co., Ltd., Jan. 1, 2000, vol. 32, No. 1, pp. 36-41.
IPRP dated Sep. 15, 2009 and Written Opinion dated Apr. 22, 2008 regarding PCT Application No. PCT/ US2007/015149.
Notice of Reasons for Rejection dated Jan. 10, 2012 regarding Japan Patent Application No. JP2009-553557.
Akanksha, et al; "Animation toolkit based on a database approach for reusing motions and models," Published online Nov. 30, 2006, Copyright Springer Science+ Business Media, LLC 2006, Multimed Tools Appl (2007) 32:293-327.
Behr, et al; "Utilizing X3D for Immersive Environments," Copyright 2004 by the Association for Computing Machinery, Inc.
Dietrich, et al; "VRML Scene Graphs on an Interactive Ray Tracing Engine," IEEE Virtual Reality Mar. 27-31, 2004. Chicago, IL USA.
Müller, et al; "Multifaceted Interaction with a Virtual Engineering Environment using a Scenegraph-oriented Approach," Fraunhofer Institute for Media Communication Virtual Environments Competence Center Schloss Birlinghoven, Sankt Augustin, Germany, 2003.
International Search Report dated Apr. 22, 2008.

METHOD AND SYSTEM FOR ACCESSIBILITY AND CONTROL OF PARAMETERS IN SCENEGRAPHS

CROSS-REFERENCE TO RELATED APPLICATIONS

This application is a continuation of U.S. patent application Ser. No. 15/882,356, filed Jan. 29, 2018, which is a continuation of U.S. patent application Ser. No. 15/043,290, filed Feb. 12, 2016, and issued as U.S. Pat. No. 9,911,227, which is a continuation of U.S. patent application Ser. No. 12/450,125, filed Jun. 18, 2010, and issued as U.S. Pat. No. 9,292,964 on Mar. 22, 2016, which claims priority to International Application No. PCT/US2007/015149, filed on Jun. 28, 2007, which claims priority to U.S. Provisional Application Ser. No. 60/918,131, filed Mar. 15, 2007, the entire contents of each of which are expressly incorporated by reference herein in their entireties.

TECHNICAL FIELD

The present invention relates to scenegraphs and more particularly to the accessibility and control of parameters during the rendering of a scenegraph.

BACKGROUND OF THE INVENTION

A scenegraph is a hierarchical structure composed of nodes, also called Objects, which can be either grouping nodes (intersection between branches) or leaves. Such structure is usually used as storage for 2D or 3D Graphics information (e.g., Geometrical Model) and their composition in order to render them.

A scenegraph can include animation information formed by either temporal interpolation means or frame based animation (e.g., in the case of Macromedia Flash). It can also contain sensors representing allowed User Interactions with the scene or objects composed within. Such animation must be fully described and interaction triggers routed correctly within the scenegraph in order to operate correctly.

The use of Scenegraphs in the Computer Graphics domain has been generalized for several years. Most 3D Authoring Tools (e.g., Autodesk 3D Studio or Maya) and 3D Rendering engines (e.g., Pixar RenderMan) internally (i.e., inside the application). use scenegraphs as data structures and as file formats for interchange (e.g., VRML, COLLADA). User controls during the rendering of a scenegraph are relatively limited, due to the fact their description must be embedded in the scenegraph. That is, unfortunately, there is no easy means in currently available technologies for defining direct Application User Interface controls for animations and parameters within a scenegraph or during rendering of the same.

SUMMARY OF THE INVENTION

Embodiments of the present invention provide an easy means to enable control of the parameters of a scenegraph and a method to treat those controls and present them to the user at the application level. Embodiments of the present invention also enable the definition of constraints for the user interaction, using value ranges, increments, defaults, and user or platform profiles for allowing or not allowing certain controls.

In one embodiment of the present invention, a method for controlling a scenegraph includes redefining a set of elements within a scene graph, accessing selected information in the scenegraph in accordance with the redefined elements, and providing means for controlling the selected information.

In an alternate embodiment of the present invention, a system for controlling a scenegraph includes a means for redefining a set of elements within a scenegraph, a means for accessing selected information in the scenegraph in accordance with the redefined elements, and a means for controlling the selected information

BRIEF DESCRIPTION OF THE DRAWINGS

The teachings of the present invention can be readily understood by considering the following detailed description in conjunction with the accompanying drawings, in which.

Figure 1:
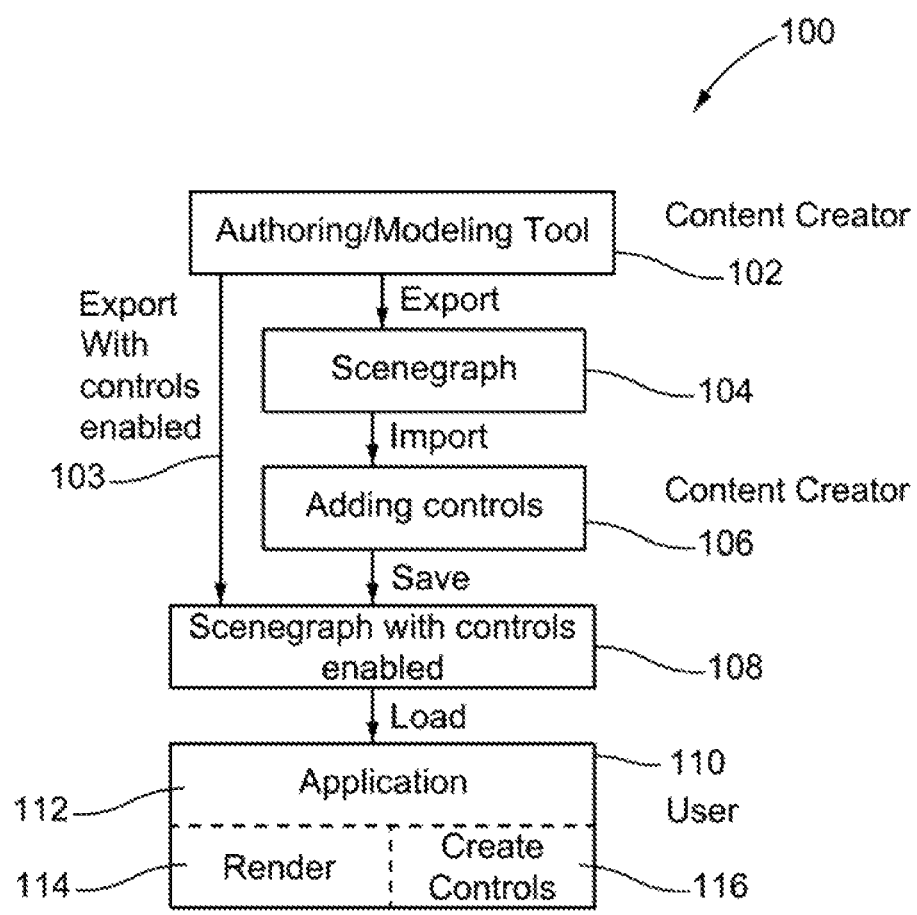
FIG. 1 depicts a flow diagram of a process for enabling the control of scenegraph parameters in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

Many standards for a scenegraph description have been defined including VRML (Virtual Reality Modeling Language), X3D (eXtensible 3D), MPEG-4 Systems, COLLADA and Java3D. Such standards use either a textual representation or XML. In addition, several proprietary standards also exist (e.g., Microsoft DirectX format, NVIDIA NVSG, etc.). In all of these representations however, the primary means for enabling user interaction is to either integrate all interactions (sensors) and behaviors within the scenegraph to embed the whole model in a super-structure (e.g. prototype in VRML/X3D), or to develop a specific application using the scenegraph Application Interface (referred to as EM—External Application Interface—in VRML, SAI—Scene Access Interface—in X3D, DirectX is the interface for the Microsoft format and MPEG-J is the interface in MPEG-4 Systems).

Describing the entire interaction and control within the scenegraph, as in the first listed solution, requires a rendering engine for the scenegraph to include an Execution engine to process the animations and interactions events (see description in the VRML handbook). This is because the Application User Interface in these cases does not have knowledge of the scenegraph. As such, specific source code must be developed in order to extract data from the Scenegraph and in order to give a user access to them. The second solution described above includes using a prototype as defined in VRML/X3D (see VRML handbook). This solution, as described in the VRML handbook is "A protection mechanism that allows an author to limit what can be done to an object". The problem, however, is that this "prototype node" technique does not allow: 1) profiles management; 2) easy limitation of values for parameters (the only possible way is to use scripts in this case); and 3) it does not provide for any easy containment for creating a User Interface to control fields (i.e., there is no real name given to the parameters besides an identifier name for processing events in the Execution engine, and the prototype technique only helps in interactions between objects (nodes) within the scenegraph, not the user). In addition, using this technique does not allow for the simple addition of new parameters to be presented to the user since the "prototype node" hides the actual scenegraph structure from the user.

The third technique described above uses a Scenegraph Access Interface (SA1) such as X3D specifications for the SAL Such Interfaces are either bound to a language, (i.e., VRML EAT is a Java binding). The technique here is then to develop a specific User Interface to get access to the scenegraph information. This technique allows access to any member of the scenegraph. However, accessing all the fields means the user must know the whole scenegraph structure and have knowledge of all its structural elements (nodes, fields, etc). Moreover, names in the scenegraph might not be clear enough to a user, due to the name of their grammatical composition, e.g. the space character is not allowed.

Embodiments of the present invention can apply to any existing scenegraph description language (e.g., textual or XML), provided the implementation matches the chosen scenegraph file format grammar. A parser can then decide to treat or not treat the nodes defined by the present principles, allowing or not allowing the feature of the present invention. The application can also choose not to display the User Interface controls defined by the present principles. For example, not treating the new feature of the present invention would be very straight forward on the parsing side, as all nodes have bounds, sometimes represented as brackets (e.g., {'and '}') or XML tag brackets (e.g., '<node>' and '</node>'). The parser then only needs to ignore the complete feature declaration in the scenegraph, limited to its brackets.

Embodiments of the present invention include a set of additional components or nodes (depending on the scenegraph structure) needed to enable the access to the selected scenegraph information from the Application User Interface without modifying the original scenegraph description. The new components or nodes enable the redefining of the targeted scenegraph information's semantic to be presentable to the user, for example, with a comprehensible name and modifier on the user interface. This information can then be controlled through a newly created Graphical Interface widgets provided to the user through their graphical user interface. For example, in one embodiment of the present invention, Feature Identifiers can be represented with matching closing and opening brackets, defined in compliance with the scenegraph grammar. In addition, Profiles Identifiers can be represented by a list of strings or identifiers describing the profiles. A profile can include a user, for example, describing access rights, or platform, for example, describing capabilities and/or profile. Containment of those profile identifier strings can be application dependant, or either a name description or a numeric value. If this list of strings is empty, all defined controls will be available to all users or platforms. Certain implementations of alternate embodiments of the present invention, however, may not use this information at all (i.e., instances in which profiles are not present on a platform, such like a decoder STB—Set Top Box—), while other embodiments can manage profiles at a separate layer in the application (i.e., in the case of static profiles in a platform, like a switcher). Embodiments of the present invention can further include a List of controlled items in the scenegraph for each of them.

The identifiers in the scenegraph include a list of strings or identifiers which define the targeted information in the scenegraph and are usually composed of the node's name definition or identifier and the node's field's name or identifier to be controlled. If an identifier is not found at the current parsing level in the scenegraph, its control should not be activated. The application can then retrieve the field value type (e.g., float, integer) as a result of its definition in the scenegraph. This field is essentially a list of strings that allow grouped modification, for example, several color fields at the same time, under a single User Interface component. It is therefore necessary that the fields listed are of the same type.

Embodiments of the present invention can further include a name appearing on the application User Interface. This will usually be different from the identifier name mentioned in the previous paragraph, as usually identifiers in a scenegraph are syntactically restricted in the grammar (no space or specific character) and may not present an appropriate description (i.e., these identifiers are usually automatically generated by the graphics modeling tool).

In accordance with embodiments of the present invention, a reset or factory value can include a value to set the parameter when a "reset" or "factory default" button is activated on the User Interface. This value may be different from the value in the scenegraph itself, since the scenegraph stores values at a specific instant. Even further, minimum and maximum values can be included which define a range of values valid for the parameter. The minimum and maximum values define limits for the User Interface controls.

The Application of embodiments of the present invention can further include a Step Increment, which corresponds to a stepwise increment (absolute value) to apply to a parameter (positively or negatively) on the User Interface by, for example, pushing a '+' or '−' button, and defined Profiles for which this control is enabled. That is, selected profiles identifiers (e.g., those listed above or other application defined identifiers) for which this control is enabled can be listed here.

In one embodiment of the present invention, all values are represented in the field type numeric domain. If the chosen scenegraph does not provide a generic field type, for representing, for example, Floating values and Booleans, the largest domain can be used to define those parameters. For example, a float representation can be used and the value can be cast as an integer or boolean. In accordance with embodiments of the present invention, all values can be an array of numbers, as many parameters can be composed of more than one element or component, for example, a color with RGB values (Red, Green and Blue). If the number of elements/components making up the controlled field and the number of elements/components contained in the minimum, maximum, reset and increment values differ, only the minimum number of elements on those latter values matching the number of elements/components in the controlled field shall be used. For example, if the controlled field represents a RGB color with 3 components and the "reset" value is defined as "[1.0 1.0 1.0 1.0]", the system will only use the 3 first elements and leave the last one unused.

If the node in which the controlled field is contained is destroyed during the execution of the scenegraph, the User Interface control linked to this node can be deactivated or destroyed as well. Embodiments of the present invention also allow controlled items to be grouped. This allows for the grouping of a list of parameters on the User Interface in a more natural way, for example, a "car" composed of "wheels", or allows for an override of the scenegraph natural hierarchical structure for presenting the information to the user. This grouping feature can be named as well, and can recursively contain other groups.

Embodiments of the present invention can be implemented on any existing scenegraphs, with the only restrictions being those inherent to each scenegraph model. For example, VRML 2.0 does not provide a generic field type, thus only "SFFloat" can be used as the largest domain.

For example, a VRML 2.0 nodes implementation of the present invention can be represented as follows:

```
Control Profiles(
    Filed MFString profiles [ ]
)
```

The "ControlProfiles" nodes can be discarded if profiles are defined at the application layer.

```
ControlGroup {
    field SFString name "car"
    field MFNode items [ ]
)
```

The "items" field can contain a list of "ControlItems" (see below) or other "ControlGroup" nodes. The "name" field defines the group name to be presented to the user, for example, "car". The "profiles" field as presented overrides the profile designation on the individual items in the "items" list, allowing the profile to easily control the whole group.

```
ControlItem {
    field MFString identifiers [ ]
    field SFString name " "
    field MFFloat resetValue [ ]
    field MFFloat minValue [ ]
    field MFFloat maxValue [ ]
    field MFFloat stepIncrement [ ]
    field MFString profiles [ ]
}
```

In the embodiment described above, the "profiles" list contains a list of profiles as defined by the "ControlProfiles" node or application-dependant values.

In an alternate embodiment of the present invention, a PROTO structure concept within VRML 2.0 implementation can be represented as follows:

```
CONTROLGROUP [
    field MFString profiles [ ]
    field fieldtypename "name" IS [identifiers]
    [resetValue] [minValue] [maxValue]
    [stepincrement] [profiles]
]
{
    # Internal Scenegraph section
}
```

In yet an alternate embodiment of the present invention, an X3D nodes implementation of the present invention can be represented as follows:

```
<ControlGroup name="" profiles=[ ]>
    <ControlItem identifiers=[ ] name="" resetValue=[ ]
    minValue=[ ] maxValue=[ ] stepIncrement=[ ]
    profiles=[ ]/>
</ControlGroup>
```

FIG. 1 depicts a flow diagram of a process for enabling the control of scenegraph parameters in accordance with an embodiment of the present invention. The process 100 of FIG. 1 begins with an Authoring or Modeling Tool 102 including the control methods of an above described embodiment the present invention. At step 103, a content creator exports a subject scenegraph. If the scenegraph has the controls enabled, the process continues to step 108. If the authoring/modeling tool does not supply such functionality to the scenegraph a specific module can be created to add the controls afterwards. For example, when the authoring modeling tool 102 does not supply such functionality, an author exports the scenegraph 104, to module 106 for adding the necessary controls. The scenegraph with the controls is then enabled 108 and loaded into the application block 110. The Application 112 then loads the scenegraph to render it 114 and can now create the controls 116 (and make them available to the user) on the Graphical User Interface.

In one embodiment of the present invention, the application 112 can directly embed the create controls module 116 to add the user controls. This can be useful for a content creator to verify correct execution and rendering of the scenegraph and its corresponding controls.

Figure 2:
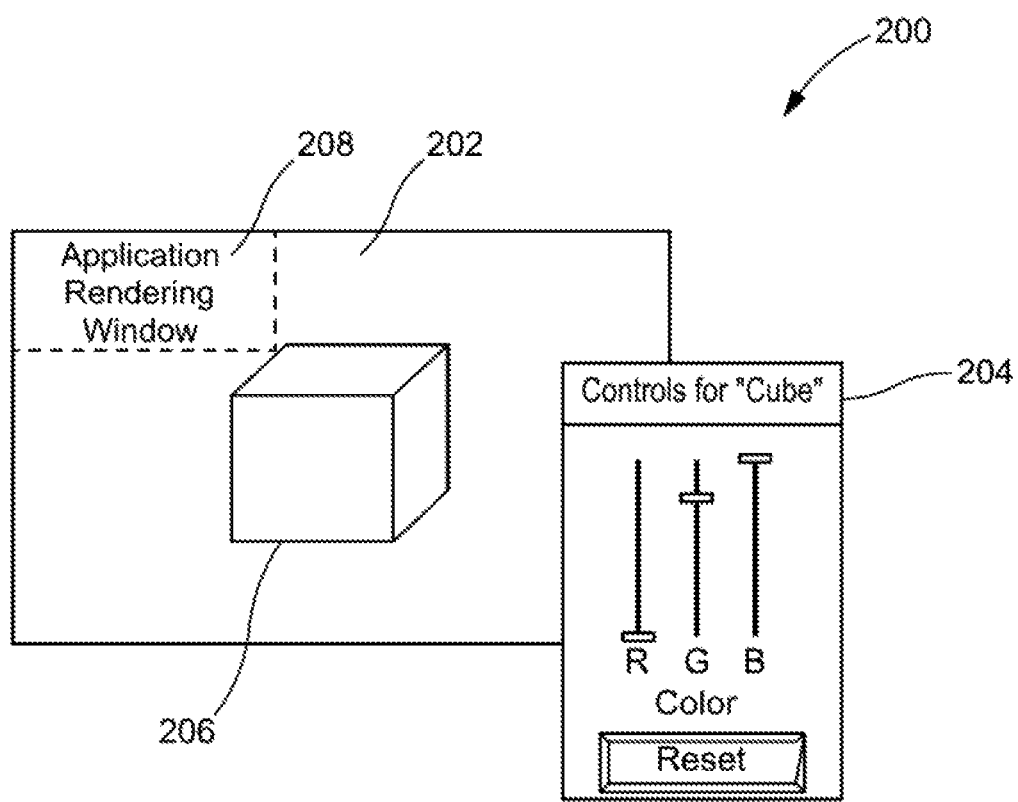
FIG. 2 depicts a graphical representation of a scenegraph and corresponding controls in accordance with an embodiment of the present invention.

FIG. 2 depicts a graphical representation of a scenegraph and corresponding controls in accordance with an embodiment of the present invention. The embodiment of FIG. 2 shows a rendering of a scenegraph 200 (simple cube in this case) and its controls (simple RGB color selection in this case) by an application which supports the methods of the present invention. The scenegraph includes a white background 202, a light-blue cube 206 displayed on the application rendering window 208 and the controls window 204 created by the application with respect to the interpretation of the VRML nodes embodiment. The scenegraph example used in FIG. 2 is written using VRML 2.0 Scenegraph, with the profiles being deactivated. In accordance with one embodiment of the present invention, the VRML 2.0 description of the scenegraph can be represented as follows:

```
Shape {
    Geometry Cube { }
    Appearance Appearance {
        material DEF MAT Material {
        }
    }
}
ControlGroup {
    name "Cube"
    items ControlItem {
        identifiers "MAT diffuseColor"
        name "Color"
        resetValue [ 0.0 0.0 0.0 ]
        minValue [ 0.0 0.0 0.0 ]
        maxValue [ 1.0 1.0 1.0 ]
        stepIncrement [ 0.1 0.1 0.1 ]
        profiles [""]
    }
}
```

As depicted in the example above, the application 112 uses the Control Item to establish a binding between the name "Color" from the Control Group "Cube" and the scenegraph field "diffuseColor", part of the "MAT" node, which type is SFColor in the VRML 2.0 specifications, and thus functionally supports the desired controls (i.e., 3 editable fields for Red, Green, and Blue color levels). This is shown by the controls window 204 in FIG. 2 where the individual R, G and B controls are shown.

Figure 3:
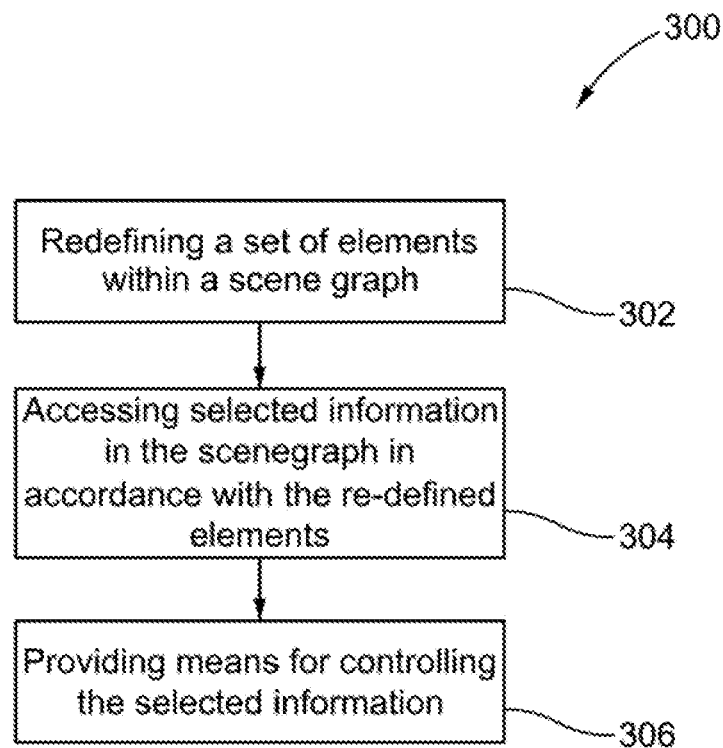
FIG. 3 depicts a flow diagram of a method for accessibility and control of parameters in a scenegraph in accordance with an embodiment of the present invention.

FIG. 3 depicts a flow diagram of a method for accessibility and control of parameters in a scenegraph in accordance with an embodiment of the present invention. The method 300 of FIG. 3 begins at step 302 in which a set of elements within the scenegraph are initially redefined. The method then proceeds to step 304.

At step 304, once redefined the selected information in the scenegraph is accessed in accordance with the redefined elements. The method then proceeds to step 306.

At step 306, when the selected information has been accessed, means are provided to control the selected information.

Figure 4:
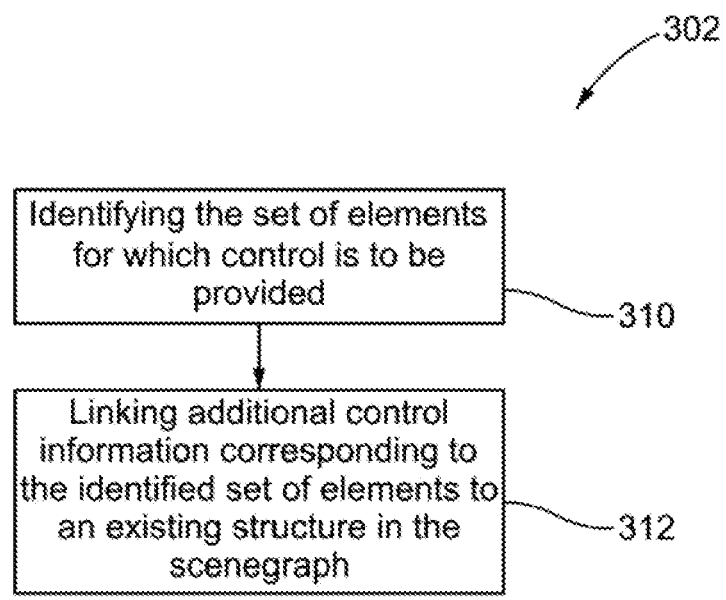
FIG. 4 depicts a flow diagram of the re-defining step of the method of FIG. 3 in accordance with an embodiment of the present invention.

FIG. 4 depicts a flow diagram of the re-defining step 302 of the method 300 of FIG. 3 in accordance with an embodiment of the present invention. In order to redefine the elements as defined in the method 300 of FIG. 3, initially the set of elements for which control is to be provided is identified at step 310. At step 312, once identified, additional control information is linked to the corresponding identified set of elements to the existing structure in the scenegraph.

Figure 5:
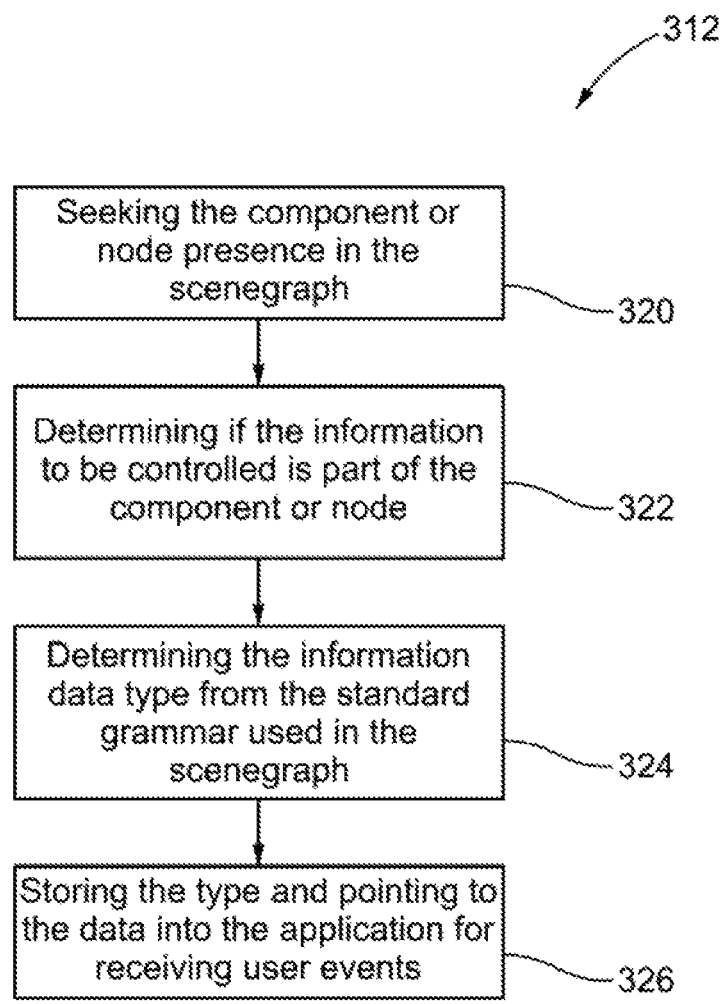
FIG. 5 depicts a flow diagram of the linking step of the method of FIG. 4 in accordance with an embodiment of the present invention.

FIG. 5 depicts a flow diagram of the linking step 312 of the method of FIG. 4 in accordance with an embodiment of the present invention. In the embodiment of FIG. 5, in order to link the additional information, there is an initial seeking of the component or node presence within the scenegraph at step 320. At step 322, it is then determined if the information to be controlled is part of the component or node. Once this determination has been made, another determination of the information data type from the standard grammar used in the scenegraph is made at step 324. At step 325, with all the above described determinations made, the type and point to the data can be stored into the application for receiving user events.

The various aspects, implementations, and features may be implemented in one or more of a variety of manners, even if described above without reference to a particular manner or using only one manner. For example, the various aspects, implementations, and features may be implemented using, for example, one or more of a method, an apparatus, an apparatus or processing device for performing a method, a program or other set of instructions, an apparatus that includes a program or a set of instructions, and a computer readable medium.

An apparatus may include, for example, discrete or integrated hardware, firmware, and software. As an example, an apparatus may include, for example, a processor, which refers to processing devices in general, including, for example, a microprocessor, an integrated circuit, or a programmable logic device. As another example, an apparatus may include one or more computer readable media having instructions for carrying out one or more processes.

A computer readable medium may include, for example, a software carrier or other storage device such as, for example, a hard disk, a compact diskette, a random access memory ("RAM"), or a read-only memory ("ROM"). A computer readable medium also may include, for example, formatted electromagnetic waves encoding or transmitting instructions. Instructions may be, for example, in hardware, firmware, software, or in an electromagnetic wave. Instructions may be found in, for example, an operating system, a separate application, or a combination of the two. A processor may be characterized, therefore, as, for example, both a device configured to carry out a process and a device that includes a computer readable medium having instructions for carrying out a process.

Having described preferred embodiments for a method and system for providing access to and control of parameters within a scenegraph (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

What is claimed:

1. A graphics modeling system for generating a user interface to modify computer graphics, the graphics modeling system comprising:
    a graphic feature identifier configured to parse a computer graphic rendering data object of at least one computer graphic to identify at least one feature identifier associated with at least one element in the computer graphic rendering data object;
    a user interface generator configured to automatically generate a user interface that includes a widget that is based on the identified at least one feature identifier and configured to control a modifiable parameter of the at least one element;
    a control linking module configured to link the generated user interface to the computer graphic rendering data object, such that operation of the user interface automatically modifies the modifiable parameter of the at least one element; and
    a parameter controller configured to automatically adjust the modifiable parameter based on the operation of the widget in the generated user interface,
    wherein the user interface displays a name for the at least one element that is different than the identified at least one feature identifier, and
    wherein the user interface generator is further configured to determine at least one field value type for the modifiable parameter, and to automatically generate the user interface with the widget that includes the modifiable parameter that is configured to be modified based on the determined at least one field value type.

2. The graphics modeling system according to claim 1, wherein the computer graphic rendering data object is a scenegraph that comprises a scenegraph description language and the identified at least one feature identifier is syntactically restricted in grammar when the scenegraph is generated in the scenegraph description language.

3. The graphics modeling system according to claim 2, wherein the syntactically restricted at least one feature identifier comprises no spaces and no specific characters.

4. The graphics modeling system according to claim 2, wherein the computer graphic rendering data object is a hierarchical data structure of nodes for rendering the at least one computer graphic.

5. The graphics modeling system according to claim 2, wherein user control for the modifiable parameter is not embedded in the scenegraph description language of the scenegraph.

6. The graphics modeling system according to claim 1, wherein the user interface generator is further configured to automatically generate the user interface with the widget that includes the modifiable parameter and to display a name for the modifiable parameter that is different than the at least one feature identifier.

7. The graphics modeling system according to claim 1, further comprising a control constraint module configured to determine whether the computer graphic rendering data object provides a generic field type and uses a largest domain in the computer graphic rendering data object to identify the at least one feature identifier in the computer graphic rendering data object when the computer graphic rendering data object does not provide a generic field type.

8. The graphics modeling system of claim 1, further comprising a video display configured to concurrently display a rendering of the computer graphic rendering data object and the generated user interface.

9. A graphics modeling system for generating a user interface to modify computer graphics, the graphics modeling system comprising:
   a feature determiner configured to analyze a computer graphic rendering data object of at least one computer graphic to identify at least one feature identifier associated with at least one element in the computer graphic rendering data object;
   a user interface generator configured to automatically generate a user interface that includes a widget that is based on the identified at least one feature identifier and configured to control a modifiable parameter of the at least one element; and
   a parameter controller configured to adjust the modifiable parameter based on operation of the widget in the generated user interface,
   wherein the widget displays a name that is different than the identified at least one feature identifier.

10. The graphics modeling system according to claim 9, wherein the widget displays the name thereon that is based on the identified at least one feature identifier and that modifies a grammatical composition or character string of the at least one feature identifier, such that the name of the widget is generated for a user to identify associated functionality of the generated user interface.

11. The graphics modeling system according to claim 10, wherein the computer graphic rendering data object comprises a scenegraph description language and the identified at least one feature identifier is syntactically restricted in grammar when the computer graphic rendering data object is generated in the scenegraph description language, with the syntactically restricted at least one feature identifier comprises no spaces and no specific characters.

12. The graphics modeling system according to claim 11, wherein user control for the modifiable parameter is not embedded in the scenegraph description language of the scenegraph.

13. The graphics modeling system according to claim 10, wherein the user interface generator is further configured to automatically generate the user interface with the widget that includes the modifiable parameter and to display a name for the modifiable parameter that is different than the at least one feature identifier.

14. The graphics modeling system according to claim 9, wherein the feature determiner is further configured to determine a field value type for the modifiable parameter, and the user interface generator is further configured to automatically generate the user interface with the widget that includes the modifiable parameter configured to be modified based on the determined field value type.

15. The graphics modeling system according to claim 9, further comprising a control constraint module configured to determine whether the computer graphic rendering data object provides a generic field type and uses a largest domain in the computer graphic rendering data object to identify the at least one feature identifier in the computer graphic rendering data object when the computer graphic rendering data object does not provide a generic field type.

16. The graphics modeling system of claim 9, further comprising a video display configured to concurrently display a rendering of the computer graphic rendering data object and the generated user interface.

17. A graphics modeling system for modifying one or more elements of a computer graphic rendering data object, the system comprising:
   a user interface generator configured to generate a user interface for modifying at least one parameter of at least one element in a computer graphic rendering data object for at least one computer graphic; and
   a parameter controller configured to modify the at least one element of the computer graphic rendering data object based on one or more inputs received by the generated user interface to modify the at least one parameter,
   wherein the user interface generator is further configured to adapt at least one feature identifier in one syntax of the computer graphic rendering data object into a name in another syntax according to which at least one of a grammatical composition or character string of the at least one feature identifier is modified to be comprehensible on the user interface for identification of associated functionality of the user interface.

18. The graphics modeling system according to claim 17, further comprising a feature identification module configured to identify the at least one feature identifier of the at least one element in the computer graphic rendering data object of the at least one computer graphic.

19. The graphics modeling system according to claim 18, wherein the feature identification module is further configured to determine a field value type for the at least one parameter.

20. The graphics modeling system according to claim 19, wherein the user interface generator is further configured to automatically generate the user interface with a widget that includes an interface for modifying the at least one parameter based on the determined field value type.

21. The graphics modeling system according to claim 17, further comprising a data structure object parser configured to parse the computer graphic rendering data object to identify the at least one element that includes at least one of a node and a field of the computer graphic rendering data object.

22. The graphics modeling system of claim 21, wherein the user interface generator is further configured to automatically generate the user interface in response to the data structure object parser parsing the computer graphic rendering data object to identify the at least one element.

23. The graphics modeling system according to claim 17, wherein the computer graphic rendering data object comprises a scenegraph description language and the at least one feature identifier is syntactically restricted in grammar in the scenegraph description language, with the syntactically restricted at least one feature identifier having no spaces and no specific characters.

24. The graphics modeling system according to claim 23, wherein user control for modifying the at least one parameter is not embedded in the scenegraph description language.

25. The graphics modeling system according to claim 17, wherein the user interface generator is further configured to automatically generate the user interface with a widget that includes elements for modifying the at least one parameter.

26. The graphics modeling system according to claim 25, wherein the user interface generator automatically generates the user interface with the widget that displays a name for the at least one parameter that is different than the at least one feature identifier.

27. The graphics modeling system according to claim 17, further comprising a control constraint module configured to determine whether the computer graphic rendering data object provides a generic field type and uses a largest domain in the computer graphic rendering data object to identify the at least one feature identifier in the computer graphic rendering data object when the computer graphic rendering data object does not provide a generic field type.

28. The graphics modeling system of claim 17, further comprising a video display configured to concurrently display a rendering of the computer graphic rendering data object and the generated user interface.

* * * * *